United States Patent [19]

Uchida et al.

[11] Patent Number: 4,466,392
[45] Date of Patent: Aug. 21, 1984

[54] AUTOMATIC ENGINE STOP-RESTART SYSTEM

[75] Inventors: Shigekatsu Uchida; Takao Akatsuka; Takahide Kawamura, all of Aichi, Japan

[73] Assignee: Toyota Jidosha Kabushiki Kaisha, Aichi, Japan

[21] Appl. No.: 397,180

[22] Filed: Jul. 12, 1982

[30] Foreign Application Priority Data

Jul. 22, 1981 [JP] Japan ................................ 56-114575

[51] Int. Cl.³ ............................................. F02N 11/08
[52] U.S. Cl. ................................ 123/179 G; 123/333; 123/198 DB
[58] Field of Search ................... 123/332, 333, 179 G, 123/179 K, 198 DB, 198 F, 493

[56] References Cited

U.S. PATENT DOCUMENTS 4,153,033  5/1979  Iizuka ............................... 123/198 F
4,192,279  3/1980  Maisch et al. ................... 123/333 X
4,362,133  12/1982 Malik ................................ 123/179G Primary Examiner—William A. Cuchlinski, Jr.
Attorney, Agent, or Firm—Oblon, Fisher, Spivak, McClelland & Maier

[57] ABSTRACT

In automatically stopping and restarting an engine on the basis of the operating conditions of various parts in a vehicle, the automatic engine stop and restart are effected by cutting off a fuel system, but not cutting off an igination system. More specifically, a fuel control valve is provided in a path for feeding fuel to a slow port, and this control valve is closed on condition that at least the vehicle speed is in the state of zero and other conditions of allowing the automatic engine stop and restart are not met. An ignition signal taken from the energized ignition system is used to ensure that the engine is not started when it is already running.

11 Claims, 2 Drawing Figures

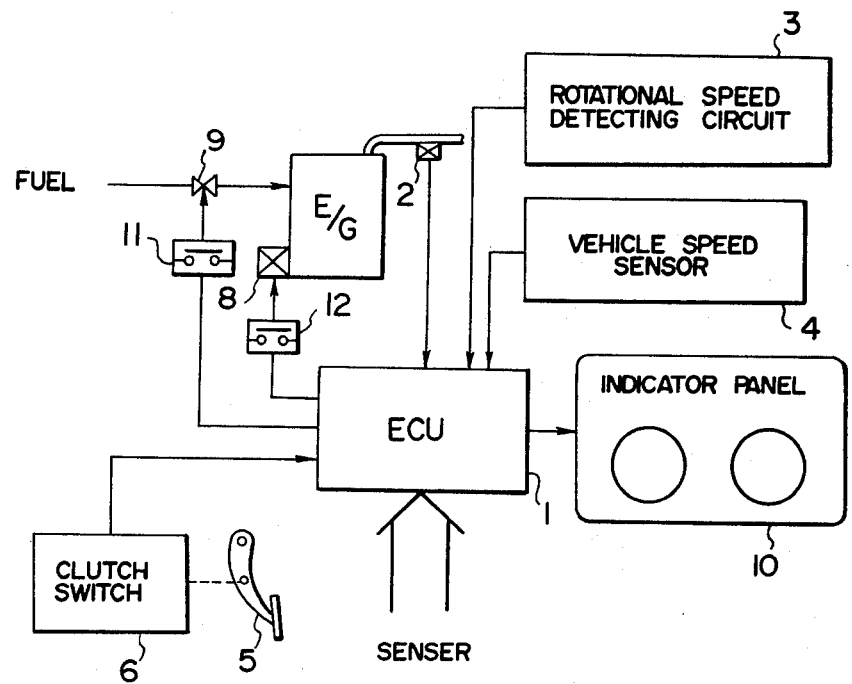

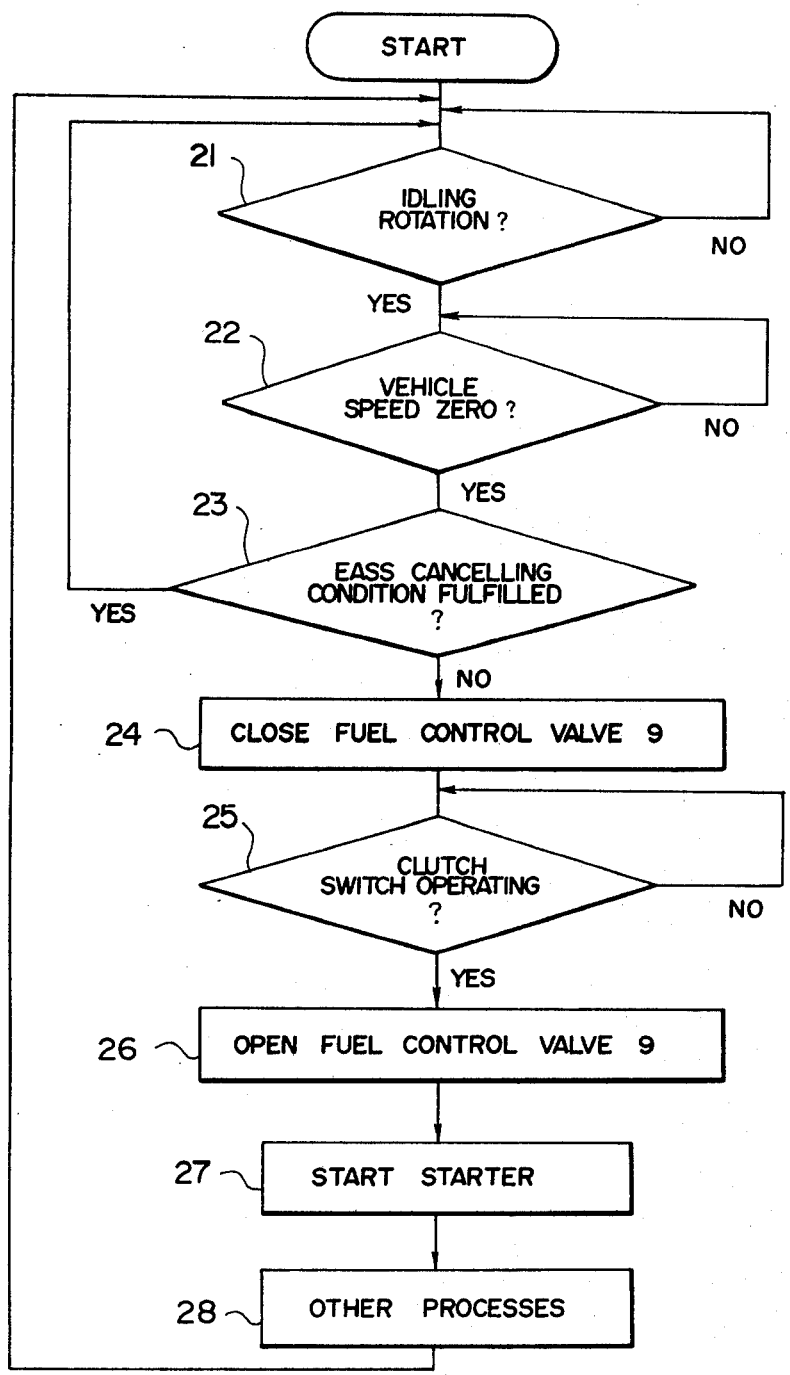

AUTOMATIC ENGINE STOP-RESTART SYSTEM

BACKGROUND OF THE INVENTION

1. Field of the Invention

This invention relates to an automatic engine stop-restart system capable of automatically stopping or restarting an engine in accordance with the operating conditions of a vehicle.

2. Description of the Prior Art

Some motor vehicles have mounted thereon an automatic engine stop-restart system capable of automatically stopping an engine, and thereafter, restarting the engine by an ordinary starting operation (for example, the depression of a clutch pedal) when the vehicles are stopped at an intersection and the like during running through an urban district. The provision of such a system as described above makes it possible to limit the operation of the engine to the time when necessary, thereby enabling to achieve decreased quantities of exhaust gas and reduced fuel consumption.

Heretofore, there has been adopted a method of cutting the current passage to an igniter by a relay or the like in stopping the engine by the system of the type described. More specifically, the current passage to an ignition system a cut off to prevent an ignition plug from discharging a high voltage, whereby explosions do not occur in combustion chambers of the engine, thus enabling to stop the engine.

However, heretofore, the automatic engine stop-restart system has been arranged only to cut the current passage to the ignition system, thereby allowing the residual fuel being stagnant in a fuel supply system such as a slow-port and the like to enter the engine combustion chambers in the process of reciprocation of pistons due to the inertial force. By this, sometimes explosions occur despite non-operation of the ignition system, thus possibly causing "run-on" of the engine.

Recently, there is a strong indication that not only the automatic stop-restart system but also a plurality of controls such as fuel control, air-fuel ratio control and ignition control are collectively controlled by a microcomputer or the like, and ignition signals (rotational speed data) are required as one of the data. Now, in the analogue type ignition circuit of the piror art, ignition signals have been obtainable until the engine is stopped. However, in the digital type ignition circuit of the recent years, such an arrangement is necessitated to adopt that the power supply to the circuit is cut off simultaneously with the cut-off of the ignition system, whereby the cut-off the ignition system turns the ignition signals OFF. In consequence, there has been presented the disadvantage that the turn-OFF of a key switch causes the ignition signal data to be unobtainable.

SUMMARY OF THE INVENTION

One object of the present invention is to provide an automatic engine stop-restart system in which a fuel system is controlled to be cut off, whereby "the run-on" of an engine is prevented, thereby enabling to improve the controllability of the engine.

Another object of the present invention is to provide an automatic engine stop-restart system in which ignitions signals are obtainable even after the engine is stopped.

BRIEF DESCRIPTION OF THE DRAWINGS

FIG. 1 is a block diagram showing an embodiment of the present invention; and

FIG. 2 is a flow chart showing an example of process according to the present invention.

DETAILED DESCRIPTION OF THE INVENTION

FIG. 1 is a block diagram showing one embodiment of the present invention.

The core of the system is an electronic control unit (hereinafter referred to as "ECU") 1, and, for example, a microcomputer is used as the ECU, in which case, the ECU is applied to a plurality of controls including an air-fuel ratio control, a running data indication control and the like in addition to the automatic stop-restart control under study according to the present invention. Sensors necessary for the automatic engine stop-restart control include a water temperature sensor 2 for detecting engine cooling water temperature (or a water temperature switch), a rotational speed detecting circuit 3 for detecting the rotational speed of the engine, a vehicle speed sensor 4 for detecting whether the vehicle speed is zero or not, clutch switches 6 for detecting whether a clutch pedal 5 is depressed or not (including a clutch lower switch and a clutch upper switch) and the like. If the vehicle speed and the engine rotational speed is detected to be almost zero based on these sensors, then the engine can be automatically started by the depression of the clutch pedal 5. Furthermore, the engine can be automatically stopped on condition that the vehicle speed is zero, the engine rotational speed within the range of the idling rotational speed, and other conditions of allowing the automatic engine stop are met. In addition to the above, in the cases of slow running of the vehicle, of the vehicle stop at a slope, of the vehicle stop when a right-turn signal is ON, of the engine cooling water temperature being low or high, of the head lamps being turned ON where the consumption of power is high, the automatic engine stop is not allowed because the above cases are the conditions where safety of the vehicle may be endangered. Data taken into the ECU for controlling whether the automatic engine stop will be allowed are signals from an accelerator pedal, now shown, a turn signal switch, a slope sensor for detecting a gradient of the vehicle, a lighting switch (for the head lamps and the like), a cooler switch and the like in addition to the aforesaid water temperature sensor 2. The subjects of control by the ECU 1 as shown in the drawing include control of start of a starter 8, control of a fuel control valve (solenoid valve) 9 and control of an indicator panel 10 for indicating the stopped or operating condition of the engine by a lamp or the like.

The conditions that must be met to allow the automatic stop of the engine include the vehicle speed sensor 4 having detected a vehicle speed of zero, the rotational speed detecting circuit 3 having detected rotational speed being within the range of the idling rotational speed and selected other conditions. When these conditions are met, the solenoid valve 9 is brought into the closed state from the open state, and fuel supply is cut off. This solenoid valve 9 is provided midway of a fuel supply system for feeding fuel to the slow port of an intake solenoid. Control of the solenoid valve 9 is effected by the ECU 1 in accordance with the flow chart shown in FIG. 2.

FIG. 2 shows an example of the process flow chart by the ECU 1.

In Step 21, it is judged whether the engine rotational speed is within the range of the idling rotational speed or not, and further, in Step 22, it is also judged whether the vehicle speed is zero or not. When both are judged as "Yes", it is judged whether additional conditions of allowing the automatic engine stop are present or not in Step 23. The conditions under which automatic engine stop will not be allowed may include, for example, cases of the driver's the starter by use of a key switch, of having opened the driver's seat door being open, of lowered capacity of a battery during starting of the engine, and the like. These data are obtainable from a starter switch, a door switch adapted to be turned ON when the driver's seat door is opened, and a battery voltage detecting portion for detecting the lowered capacity of the battery. If the above-described conditions of allowing the automatic engine stop are met, then, in Step 24, in order to stop the engine, a relay 11 is turned OFF to cut off the current passage to the solenoid 9, thus closing the valve. By this, the engine is stopped with "no run-on" and the ignition signals are obtainable because the ignition system (circuit) is normally operated. In addition, when the conditions of allowing the automatic engine stop are met, the process is returned to the initial step of the program, thus repeating the series of steps of process as described above.

Conditions for allowing the automatic engine restart include an engine speed of almost zero. The restart is effected by detecting whether the clutch pedal 5 is fully depressed in Step 25. When the clutch pedal 5 is fully depressed, the clutch switch 6 is operated, whereby the relays 11 and 12 are operated. By this, in Step 26, the solenoid valve 9 is opened, whereby fuel is supplied to the slow port and the starter 8 is started in Step 27, so that the engine can be automatically started. Upon completion of the process for the restart, the process goes forward to Step 28, where other controls such as the air-fuel ratio control, the ignition control and the like are effected.

As apparent from the foregoing description, according to the present invention, the engine is stopped by fuel cut, whereby "the run-on" of the engine is prevented, the engine may not be started unless its rotational speed is near zero, and the data of ignition signals (rotational speed data) necessary for the computer control are obtainable.

What is claimed is:

1. An automatic engine stop-restart system wherein the operating conditions of various parts in a vehicle are detected, and the engine is automatically stopped and restarted on the basis of the results thus detected, comprising an electronic control circuit, means for detecting engine rotational speed, fuel cut-off means for cutting off fuel to said engine, starter actuating means for activating a starter of said engine, and additional detecting means for detecting predetermined additional conditions for allowing the automatic stop or automatic restart, said additional detecting means comprising means for detecting vehicle speed and for inputting said vehicle speed to said electronic control circuit, said means for detecting engine rotational speed comprising means for maintaining an ignition system of said engine continuously energized during automatic stop and restart and means for feeding an ignition signal from said ignition system to said electronic control circuit when and only when said ignition system is energized, said electronic control circuit having an output connected to said fuel cut-off means and an output connected to said starter actuating means, said electronic control circuit comprising means for controlling said fuel cut-off means to cut off fuel, on condition that the vehicle speed is zero and said predetermined additional conditions for allowing the automatic stop are met, and for continuously sampling said ignition signal after said fuel cut-off occurs, said electronic control circuit further comprising means for controlling said starter actuating means for activating said starter when and only when said ignition signal indicates that the engine rotational speed is zero.

2. An automatic engine stop-restart system as set forth in claim 1, wherein said fuel cut-off means comprises a fuel control valve provided in a path for feeding fuel to a slow part of an intake manifold.

3. An automatic engine stop-restart system as set forth in claim 1, wherein one of said predetermined additional conditions for allowing automatic engine stop is that the engine is in idling rotation.

4. An automatic engine stop-restart system as set forth in claim 1, wherein one of said predetermined additional conditions for allowing automatic engine stop is that a starter is not in operation.

5. An automatic engine stop-restart system as set forth in claim 1, wherein one of said predetermined additional conditions for allowing automatic engine stop is that a driver's seat door is not open.

6. An automatic engine stop-restart system as set forth in claim 1, wherein one of said predetermined additional conditions for allowing the automatic engine stop is that the capacity of a battery is not lower than a predetermined level.

7. An automatic engine stop-restart system wherein the operating conditions of various parts in a vehicle are detected, and the engine is automatically stopped and restarted on the basis of the results thus detected, comprising an electronic control circuit, means for detecting engine rotational speed, fuel cut-off means for cutting off fuel to said engine, starter actuating means for activating a starter of said engine, means for producing a clutch signal indicating that a clutch of said vehicle is fully depressed, and additional detecting means for detecting predetermined additional conditions for allowing the automatic stop or automatic restart, said additional detecting means comprising speed means for detecting vehicle speed and for inputting said vehicle speed to said electronic control circuit, said means for detecting engine rotational speed comprising means for maintaining an ignition system of said engine continuously energized during automatic stop and restart and means for feeding an ignition signal from said ignition system to said electronic control circuit when and only when said ignition system is energized, said electronic control circuit having an output connected to said fuel cut-off means and an output connected to said starter actuating means, said electronic control circuit comprising means for controlling said fuel cut-off means to cut off fuel, on condition that the vehicle speed is zero and said predetermined additional conditions for allowing the automatic stop are met, and for continuously sampling said ignition signal after said fuel cut-off occurs, said electronic control circuit further comprising means for receiving said clutch signal and for responding to said clutch signal and to said ignition signal, when and only when said ignition signal indicates that the engine rotational speed is zero, by controlling said fuel cut-off means to allow fuel to flow to said engine and by controlling said starter actuating means to activate said starter.

8. An automatic engine stop-restart system as set forth in claim 7, wherein said fuel cut-off means comprises a fuel control valve provided in a path for feeding fuel to a slow port of an intake manifold.

9. An automatic stop-restart system as set forth in claim 7, wherein one of said predetermined additional conditions for allowing automatic engine stop is that the engine is in idling rotation.

10. An automatic engine stop-restart system as set forth in claim 7, wherein one of said predetermined additional conditions for allowing the automatic engine stop is that a starter is not in operation.

11. An automatic engine stop-restart system as set forth in claim 7, wherein one of said predetermined additional conditions for allowing the automatic engine stop is that the capacity of a battery is not lower than a predetermined level.

* * * * *